United States Patent [19]

Anderson

[11] Patent Number: 4,522,275
[45] Date of Patent: Jun. 11, 1985

[54] CASH TOTALIZING APPARATUS AND METHOD

[76] Inventor: Norman L. Anderson, 14160 Redhill Ave. #16, Tustin, Calif. 92680

[21] Appl. No.: 571,113

[22] Filed: Jan. 16, 1984

[51] Int. Cl.³ .................... G01G 23/22; G01G 19/52; G01G 19/00
[52] U.S. Cl. ......................................... 177/25; 177/1; 177/51; 177/144; 177/199; 364/568
[58] Field of Search ................. 177/1, 25, 51, 58, 125, 177/144, 199; 364/567, 568

[56] References Cited

U.S. PATENT DOCUMENTS

| 3,825,729 | 7/1974 | Menke . | |
|---|---|---|---|
| 4,014,397 | 3/1977 | Langevin . | |
| 4,143,724 | 3/1979 | Itani . | |
| 4,157,738 | 6/1979 | Nishiguchi et al. . | |
| 4,219,089 | 8/1980 | Gard et al. . | |
| 4,447,885 | 5/1984 | Biss | 177/25 X |
| 4,479,559 | 10/1984 | Wales et al. | 177/25 X |

FOREIGN PATENT DOCUMENTS 2114451 3/1971 Fed. Rep. of Germany .

Primary Examiner—George H. Miller, Jr.
Attorney, Agent, or Firm—Henry M. Bissell

[57] ABSTRACT

Apparatus which includes a plurality of separate weight-responsive, electronic measuring elements, such as load cells, disposed on a base insertable into the bottom of a cash drawer or the like. The drawer has a number of compartments to hold coins of different denominations, a different denomination in each compartment. The cells are disposed one per compartment and are interconnected to an electronic totalizer display unit. The cells have analog signal outputs indicative of the weight of the coins in each of the compartments. The analog signal output in each case is converted to a digital signal output and passes to a totalizer unit providing a digital display of the monetary value of the coins in each compartment, the present monetary total of all compartments, and the change just added to or removed from the drawer. The apparatus includes weighting factor units for adjusting the analog signals to reflect the differences in weight and value of the various coin denominations, for accurate totalizing. The apparatus and method are simple, inexpensive and effective to accurately total coinage amounts without requiring laborious hand counting thereof. Use of the total display comparison helps eliminate errors in making change.

16 Claims, 2 Drawing Figures

CASH TOTALIZING APPARATUS AND METHOD

BACKGROUND OF THE INVENTION

1. Field of the Invention

The present invention generally relates to totalizing means and methods and, more particularly, to an improved method and apparatus for totalizing various denominations of coins in a cash drawer and for accurately displaying the amount of change added to or removed from the drawer.

2. Description of the Prior Art

In devices for storing change, such as coin collectors and cash registers, it is generally desirable to determine the amount of money in the device from time to time. In cash registers in particular, it is generally desirable to determine the total value of the coins of each different denomination so that the total in the cash register may be ascertained. This is generally determined at least at the opening and close of business, as well as during any change of personnel operating the cash register. If feasible, it is desirable to have a continuous display and/or a hard copy printout upon demand, indicating the amount of money in the cash register as a total of all of the coins therein, as well as totals for the individual coins of different denomination.

Various devices for counting individual items are known in the prior art. German Pat. No. 2,114,451 is directed to a compartmented tray which is used to determine the calorie content of different foods. U.S. Pat. No. 3,825,729 of Menke discloses a cash box for a vending machine or the like which provides a totalizer actuated by coins passing through a slot in the cash box, thus in effect "counting" the coins inserted in the machine.

U.S. Pat. No. 4,219,089 of Gard et al describes an electronic counting scale which develops a count of the number of individual units in a group by electronically determining the weight of the group and thereafter determining the count by factoring in the average weight of an individual unit. The scale of that patent utilizes an element called a load cell, known in the prior art, for automatically performing the weighing function. The load cell and associated circuitry for processing the electrical signals developed by the load cell are disclosed in detail in that patent. That disclosure is incorporated herein by reference. Other exemplary uses of load cells in weighing apparatus may be found in U.S. Pat. Nos. 4,143,724 of Itani and 4,157,753 of Nishiguchi et al. Langevin, in patent 4,014,397, discloses an electrical counting scale utilizing an electrical load transducer for generating an electrical weight indication signal.

It is a general object of the present invention to provide a weight indication of the coins in a cash register, to thereby determine the value of the change in the cash register, and further to provide an indication of the value of the coins put into or taken from a cash register drawer when change is made, in order that errors in making change can be detected.

SUMMARY OF THE INVENTION

The improved coin totalizing method and apparatus of the present invention satisfy all the foregoing objects. The apparatus and method are substantially as set forth in the Abstract. Thus, the apparatus comprises a number of separate, weight-responsive electronic load cells or the like disposed on a base securable to a coin drawer, for example, disposed in the bottom of the drawer. The cells are adapted to be arranged in a pattern of one for each coin compartment in the drawer, so that the weight of the coins in each compartment bears directly on a separate single cell, which generates an analog signal in response thereto. Each compartment is used to hold a different denomination of coin.

The apparatus can include the coin drawer and compartment, and does include an electronic totalizer display unit interconnected to an analog readout device for visually depicting either the number of coins or their monetary sum, compartment by compartment, and the total sum of all coins in all the compartments. It can also include means for retaining and displaying the previous monetary total and for computing and displaying the amount of change just added to or subtracted from the drawer. Thus, the totalizer unit can include a hold-/release button to activate the recall of the previous total and a comparator component for calculation of the change by comparing the previous and present totals.

The apparatus also includes analog-to-digital converters disposed between and interconnected to the analog outputs and to the totalizer unit. The apparatus further includes electronic weighting factor components connected to the analog outputs and analog-to-digital converters to convert the analog output signals to digital indications of the differences in weight and preferably the value of the various denominations of coins.

The improved method involves generating a plurality of analog signals in response to the weight of the coins in the separate coin compartments of a cash drawer, applying weighting factor signal adjustments, converting the adjusted analog signals to digital signals, passing those signals to a digital totalizer display zone and displaying a readout showing the number and/or value of the separate denominations of coins in the drawer, the total monetary sum in the drawer, and preferably the previous total and the amount of change just added to or removed from the drawer.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
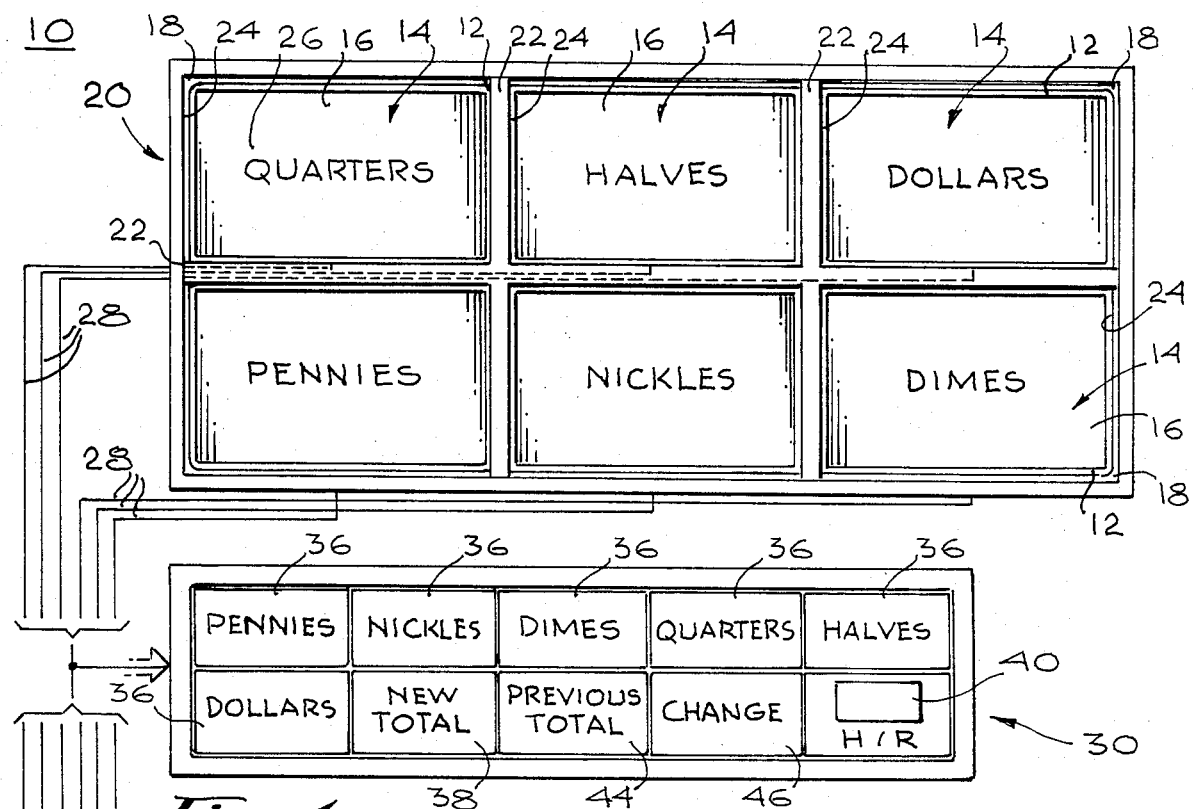
FIG. 1 is a schematic block diagram of a preferred embodiment of the improved coin totalizing apparatus of the present invention, showing the load cells of the apparatus installed in a cash drawer and the totalizing device.
Figure 2:
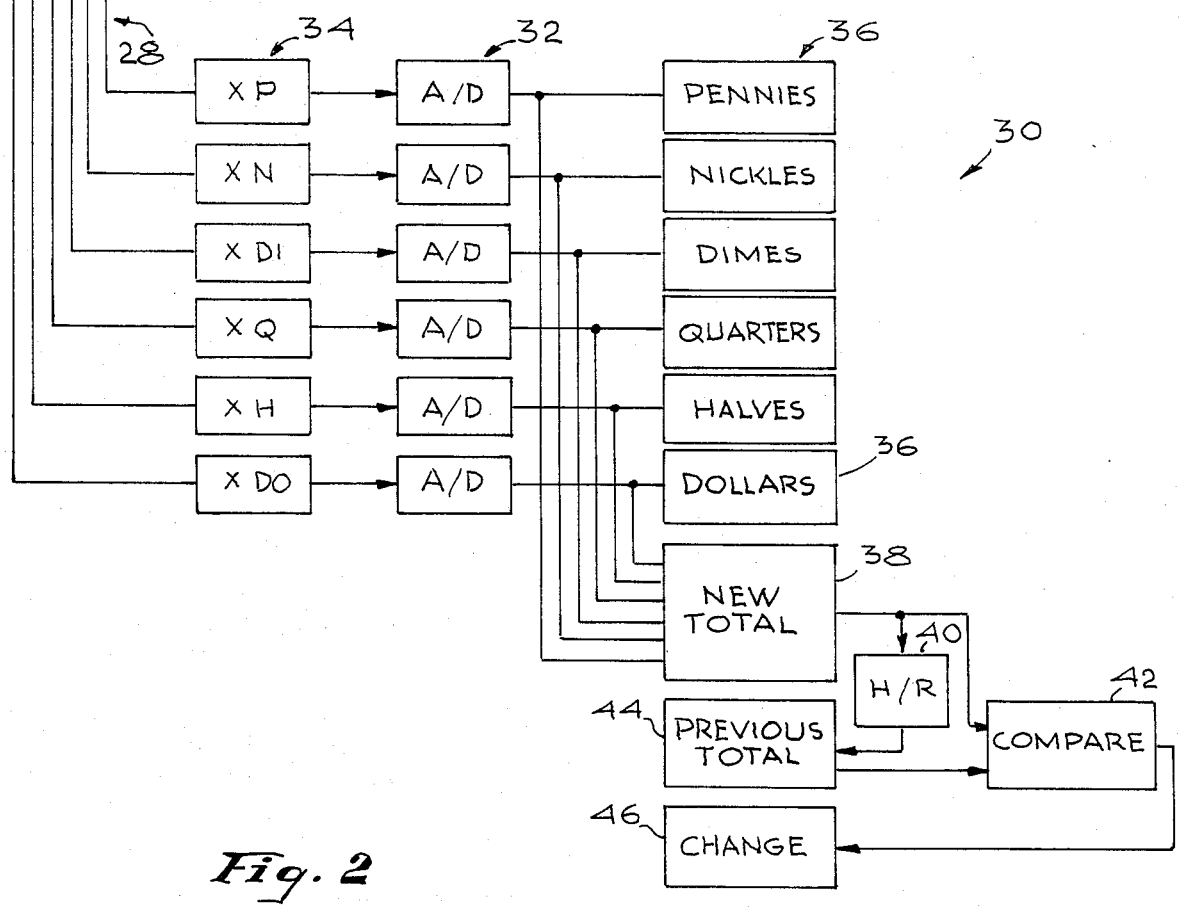
FIG. 2 is a schematic diagram illustrating various electronic components utilized in the apparatus of FIG. 1.

Now referring more particularly to FIGS. 1 and 2 of the accompanying drawings, a preferred embodiment of the improved electronic cash drawer totalizing apparatus of the present invention is schematically shown therein. Thus, in FIG. 1, apparatus 10 is depicted, which includes a flat, plate-like rectangular base 12 of metal, plastic, wood, ceramic or the like, upon the upper surface of which are mounted six spaced, generally square electronic load cells 14. Cells 14 may be of any suitable design and construction. Thus, they may be, for example, conventional load cells formed of four strain gauges (not shown) disposed in and forming part of a parallelogram-type flexure frame. The gauges may, for example, be positioned at the lower and upper surfaces of two vertically overlying corner flexure regions in the frame. Each cell 14 has a flat upper surface 16 adapted to support coins (not shown). Each cell 14 is an extremely sensitive instrument capable of accurately measuring very small differences in the weight of coins resting thereon and of generating an analog signal accurately indicating the weight of coins (not shown) pressing down on each separate surface 16.

Base 12 is shown installed on the upper surface of the bottom 18 of a cash drawer 20 which may, if desired, form part of apparatus 10. Drawer 20 may be of wood, metal, plastic, etc. and includes vertical dividers 22 which divide drawer 20 into six coin compartments 24. A different one of the cells 14 is positioned in each compartment 24. Compartments 24 may, if desired, be labeled with indicia 26 indicating the denomination of coin to be deposited in each compartment 24. Such indicia 26 can, if desired, be disposed on the upper surfaces 16 of cells 14.

Electrical conduits 28 interconnect cells 14 with an electronic totalizer unit 30. Unit 30, as shown in FIG. 2, includes conventional analog-to-digital converters 32 which receive the analog signals originating in cells 14 and convert them to digital signals for use in unit 30. Unit 30 also includes means for applying a weight factor to the analog signals from cells 14 to adjust for the differences in weight of the various coin denominations. The various coin denominations currently in use have the approximate weights listed in Table I below:

TABLE I

|  | penny | 3.11 gm. |
|---|---|---|
|  | nickel | 5 gm. |
| (clad) | dime | 2.27 gm. |
| (clad) | quarter | 5.67 gm. |
| (clad) | half dollar | 11.50 gm. |
| (clad) | Eisenhower dollar | 22.68 gm. |

Although the Susan B. Anthony dollar was issued for several years, very few have reached circulation and production of that issue has been discontinued, so it need not be considered. Only clad (nickel-copper) coinage in the dime through dollar series is normally encountered in circulation because the silver coins of those denominations have been largely hoarded and melted down for their silver content.

It will be noted from Table I that the denominational weights do not reflect their value. Thus, the penny is not 1/100 the weight of the dollar, although its value is 1/100 that of the dollar. Accordingly, it is desirable also to apply at some point in the circuitry of FIG. 2, before the ultimate display in unit 30, a value factor adjustment either to the analog signals from each of cells 14 or to subsequently generated digital signals.

As shown in FIG. 2, a separate electronic weighting factor component 34 is directly connected to each conduit 28 in unit 30, so that each analog signal is adjusted to reflect the differences in weight of the various denominations. Such component 34 may be of any conventional design and preferably is adjustable to accommodate changes in the weight of various denominations as new coin issues arise. Thus, component 34 changes the analog signal according to the standard weight of the denomination. For example, the analog signals from the penny compartment may be divided by 3.11 while those from the dollar compartment may be divided by 22.68. Average circulation coins differ very slightly in weight from newly issued coins due to wear.

Preferably, the analog signal from each individual compartment is also multiplied by the relative value factor of the coin. In the case of the penny, this is 1, while in the case of the dollar, this is 100. Thus, the dollar analog signal is multiplied by 100/22.68 to adjust for both its weight and value. Such adjusted analog signals then pass to analog-to-digital converters 32 in unit 30 and then through conventional digital read-out display circuits, where the number and/or total value of the coins of each denomination are displayed in windows 36.

A totalizer device in unit 30 sums the signals from units 32 to provide a new total in window 38 during the change transaction. Preferably, a hold/release (H/R) button 40 is provided in unit 30 along with a comparator 42, previous total window 44 and a change window 46. Normally the new total is applied immediately to the window 44 so that both windows 38 and 44 show the same value. However, the operator can press button 40 to open the circuit path therethrough, thus maintaining the signal representing the old total in window 44 for display as the old total, and to cause it to be sent to and compared in comparator 42 with the new total appearing in window 38. The resulting difference is signaled by comparator 42 to window 46 and indicated therein as the change which has just been added to or removed from drawer 20.

It will be understood that any suitable conventional electronic totalizing components can be utilized in fabricating unit 30, so long as they provide the described functions. Moreover, although window 44 is desired, it can be eliminated, as can window 46, and button 40 and comparator 42. However, the latter three components are particularly useful. It will also be understood that converters 32 and/or weighting factor components 34 can be disposed in a location outside of unit 30, if desired, for example in base 12. Furthermore, H/R switch 40 can be mounted in association with the cash drawer 20 for automatic operation whenever the cash drawer is opened.

In practicing the present invention, according to the present method, the change drawer operator makes sure that the coins of the various denominations are in their proper compartments. Then when the operator opens cash drawer 20, the switch 40 can be automatically or manually switched on to record the proper addition of change to or subtraction of change from drawer 20. As coins are placed into or removed from compartments 24, they automatically modify the analog signals generated in cells 14 by the weight of the coins in compartments 24. Such analog signals automatically pass through conduits 28 to weighting factor components 34, then to analog-to-digital converters 32 and to the rest of the circuitry in totalizer unit 30 for processing as previously described and in accordance with the present method. All the operator has to do is actuate button 40 and read the change display in window 46 to verify what has been added to or subtracted from drawer 20. Such procedure is repeated for each succeeding change transaction. No longer is there need for laboriously counting out all change in each compartment 24 to verify a change transaction. At any moment the total number and/or value of the coins of each denomination is shown in corresponding window 36, as well as the total sum of change.

Although there have been described above specific arrangements of an improved cash totalizing apparatus and method in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved cash totalizing apparatus, said apparatus comprising, in combination:

a plurality of separate weight-responsive electronic measuring means, each of said electronic measuring means being adapted to be connected to a different one of a plurality of coin compartments and to generate a signal indicative of the weight of coins in said compartment;

an electronic totalizer display unit interconnected to said electronic measuring means and responsive to said signals, said unit having computing means and display means for depicting at least one of the number of coins in each said compartment and the monetary sum of the coins in each said compartment, and at least one of the present total monetary sum of all coins in said compartments and the total monetary sum of all coins added to or removed from said compartments during a predetermined transaction time period.

2. The improved totalizing apparatus of claim 1 further including a comparator for comparing the total monetary sums at different points in time and providing a signal indicating the comparison result.

3. The improved totalizing apparatus of claim 2 wherein said totalizer display unit includes means for retaining the next previous total monetary sum of all coins in said compartments and display means for depicting the difference between said next previous total and the present total monetary sum of all coins in said compartments.

4. The improved totalizing apparatus of claim 3 wherein said totalizer unit includes a hold/release component activatable by a totalizer operator to transfer said previous total to a previous total display window and to a comparator to enable instant calculation and display in said unit of the amount of change first added to or subtracted from said previous total.

5. The improved totalizer apparatus of claim 1 wherein said weight-responsive electronic means comprise electronic load cells.

6. The improved totalizer apparatus of claim 5 wherein each of said load cells provides an analog signal output.

7. The improved totalizer apparatus of claim 6 wherein said apparatus includes analog-to-digital conversion means connected to said analog signal outputs.

8. The improved totalizer apparatus of claim 7 wherein said display unit is connected to said analog-to-digital conversion means and wherein said display means comprise digital readout display means.

9. The improved totalizer apparatus of claim 8 wherein said apparatus includes a base bearing said load cells and electronic weighting factor means for adjusting said signals to reflect the weight differences of the various coin denominations in said compartments.

10. The improved totalizer apparatus of claim 9 wherein said apparatus includes a cash register drawer, in the bottom of which said base is disposed, wherein said coin compartments are disposed over said load cells in said drawer, one for each cell, and wherein said weighting factor means are connected to said analog signal outputs for factoring into said signals the relative values of said denominations.

11. An improved method of counting and recording change, said method comprising:

generating a plurality of electronic signals, each signal being indicative of the weight of coins in a corresponding one of a plurality of coin compartments;

transferring said signals to an electronic totalizer display unit and activating said unit in response to said signals to display the monetary sum of the coins in each said compartment, the total monetary sum of all said compartments, and the total monetary sum added to or removed from said compartments during a predetermined transaction time period.

12. The method of claim 11 further including retaining the next previous monetary total, comparing it with the present monetary total and displaying the difference to indicate the amount of change just added to or removed from said compartments.

13. The method of claim 11 wherein said signals are analog signals and further including converting said signals to digital signals to activate said totalizer display unit, said unit being a digital readout display unit.

14. The method of claim 13 wherein said analog signals are generated by electronic load cells, and wherein said load cells are connected to a base positionable in a cash register drawer bearing said compartments.

15. The improved method of claim 14 further including positioning said base in said drawer and disposing said coin compartments in said drawer over said load cells.

16. The improved method of claim 14 further including adjusting said analog signals to compensate for the different weights and values of the various denominations of coins being measured.

* * * * *